(12) United States Patent
Pialot et al.

(10) Patent No.: US 10,543,567 B2
(45) Date of Patent: Jan. 28, 2020

(54) METHOD FOR PRODUCING A STRIP OF RUBBER INCLUDING NON-CONTINUOUS REINFORCEMENTS AND DEVICE FOR IMPLEMENTING SAME

(71) Applicants: COMPAGNIE GENERALE DES ETABLISSEMENTS MICHELIN, Clermont-Ferrand (FR); Michelin Recherche et Technique S.A., Granges-Paccot (CH)

(72) Inventors: Frédéric Pialot, Clermont-Ferrand (FR); Franck Daumas, Clermont-Ferrand (FR); Alain Sevaille, Clermont-Ferrand (FR)

(73) Assignee: Compagnie Generale des Etablissements Michelin, Clermont-Ferrand (FR)

( * ) Notice: Subject to any disclaimer, the term of this patent is extended or adjusted under 35 U.S.C. 154(b) by 348 days.

(21) Appl. No.: 15/518,998

(22) PCT Filed: Nov. 12, 2015

(86) PCT No.: PCT/EP2015/076460
§ 371 (c)(1),
(2) Date: Apr. 13, 2017

(87) PCT Pub. No.: WO2016/075251
PCT Pub. Date: May 19, 2016

(65) Prior Publication Data
US 2017/0216972 A1    Aug. 3, 2017

(30) Foreign Application Priority Data
Nov. 12, 2014   (FR) ..................... 14 60895

(51) Int. Cl.
*B23K 26/402*    (2014.01)
*B23K 26/08*     (2014.01)
(Continued)

(52) U.S. Cl.
CPC ........ *B23K 26/402* (2013.01); *B23K 26/0846* (2013.01); *B23K 26/38* (2013.01);
(Continued)

(58) Field of Classification Search
None
See application file for complete search history.

(56) References Cited

U.S. PATENT DOCUMENTS

| 3,570,574 A | 3/1971 | Marker et al. ................ 152/361 |
| 3,844,327 A | 10/1974 | Marzocchi .................... 152/354 |

(Continued)

FOREIGN PATENT DOCUMENTS

| EP | 0 732 227 A1 | 9/1996 |
| EP | 0 828 619 B1 | 3/1998 |
| WO | WO 2011/067211 A2 | 6/2011 |

OTHER PUBLICATIONS

Feb. 3, 2016 International Search Report and Written Opinion in International Patent Appln. No. PCT/EP2015/076460.
(Continued)

*Primary Examiner* — Jacob T Minskey
*Assistant Examiner* — Baileigh Kate Darnell
(74) *Attorney, Agent, or Firm* — Venable LLP (57) ABSTRACT

A method of manufacturing a strip of rubber having discontinuous reinforcer segments includes a conveying step in which a rubber strip is conveyed in a direction DC, and a cutting step in which reinforcers of the strip are cut. The cutting step includes localized heating of each reinforcer using a laser beam from a remote source. A cutting device useable to perform the cutting step includes a conveying (Continued)

device and a cutting head. The conveying device moves the strip in the conveying direction DC past the cutting head. The cutting head includes an emitter from which at least one laser beam is produced to cause localized heating of at least one reinforcer of the strip, in order to cut the at least one reinforcer into discontinuous reinforcer segments. The strip may be conveyed continuously or discontinuously, such that the strip may be moving or immobilized during the cutting step.

17 Claims, 4 Drawing Sheets

(51) Int. Cl.
| | | |
|---|---|---|
| *B23K 26/38* | (2014.01) | |
| *B29C 70/20* | (2006.01) | |
| *B29D 30/38* | (2006.01) | |
| *B23K 103/00* | (2006.01) | |
| *B29K 267/00* | (2006.01) | |
| *B29K 277/00* | (2006.01) | |

(52) U.S. Cl.
CPC .............. *B29C 70/20* (2013.01); *B29D 30/38* (2013.01); *B23K 2103/30* (2018.08); *B29K 2267/003* (2013.01); *B29K 2277/10* (2013.01)

(56) References Cited

U.S. PATENT DOCUMENTS

| | | | |
|---|---|---|---|
| 3,870,852 A | 3/1975 | Kogert | |
| 4,968,383 A * | 11/1990 | Volkmann | B29C 59/16 |
| | | | 216/65 |
| 5,783,003 A | 7/1998 | Lescoffit | 152/451 |
| 5,935,354 A | 8/1999 | Billieres | 152/527 |
| 6,027,786 A | 2/2000 | Ford | 428/137 |
| 9,649,891 B2 | 5/2017 | Bourgeois | B60C 15/06 |
| 2009/0050611 A1 | 2/2009 | Sukhman et al. | 219/121.79 |

OTHER PUBLICATIONS

International Search Report issued by WIPO dated Feb. 3, 2016, in connection with International Application No. PCT/EP2015/076460 (with English translation attached).

\* cited by examiner

METHOD FOR PRODUCING A STRIP OF RUBBER INCLUDING NON-CONTINUOUS REINFORCEMENTS AND DEVICE FOR IMPLEMENTING SAME

FIELD OF THE INVENTION

The invention falls within the field of tire manufacture and relates more particularly to the manufacture of a strip of rubber comprising discontinuous reinforcers.

RELATED ART

What is meant by a tire or casing is the vulcanized finished product intended to be mounted on a rim of a wheel. What is meant by a green tire is the intermediate product formed, before vulcanization, by the assembling of various semi-finished products adopting the shape of rubber plies, which may potentially be reinforced or complexed with another semifinished product, with profiled elements of rubber, potentially complexed with one another, with metal bead wires, etc.

In the design of certain parts of a tire it may be beneficial to plan discontinuous reinforcers.

For example, document WO-2011/067211 describes a tire the sidewalls of which comprise reinforcers that are discontinuous and arranged along circles concentric with the axis of rotation of the tire, namely in circumferential directions of the tire. In that document WO-2011/067211, the discontinuous reinforcers are used to stiffen the lower part of the sidewalls of the tire and to reduce the thickness of the filler element present in this lower part of the sidewalls. Thanks to this reduction in volume, the filler element dissipates less energy as the tire deforms, and the rolling resistance of this tire therefore decreases. In parallel, this document WO-2011/067211 also indicates that, surprisingly, the discontinuity of the reinforcers also makes it possible to reduce the rolling resistance of the tire.

According to another example, document U.S. Pat. No. 3,570,574 describes a tire in which the belt or reinforcement enveloping the carcass of the tire is made up of one or more plies with discontinuous reinforcers said to be at zero degrees because they are arranged at an angle of 0 to 10° with respect to the mid-plane perpendicular to the axis of rotation of the tire. In this document U.S. Pat. No. 3,570,574, the discontinuity of the reinforcers is intended to allow the ply to expand radially during the additional shaping that the green tire undergoes in a vulcanizing mould.

With a similar objective, document EP-0,828,619 foresees the presence of a ply comprising discontinuous reinforcers at zero degrees in the reinforcement enveloping the radial carcass of a tire. That document EP-0,828,619 also envisages a method of manufacturing a ply for a tire which consists in manufacturing a strip made up of at least five contiguous rows of discontinuous metal cords coated in rubber compound, in wrapping this strip on a reel using an interlayer, and in unwinding this strip in order to wind it in a spiral around a form which may be a cylindrical tire building drum or a green tire. This method is advantageous because one and the same strip can be used to form plies of different widths and therefore tires of different sizes.

However, that document EP-0,828,619 does not specify a method for obtaining a strip with discontinuous reinforcers.

Also, document U.S. Pat. No. 3,844,327 describes a method of manufacturing a ply comprising discontinuous reinforcers. It should be noted that, unlike the previous document, this document U.S. Pat. No. 3,844,327 foresees the use of a ply with discontinuous reinforcers: as a carcass ply with its reinforcers arranged radially around the axis of rotation of the tire, or the use of plies with discontinuous reinforcers in pairs and as working crown plies, the reinforcers of these two working crown plies crossing one another and being arranged symmetrically on each side of the mid-plane perpendicular to the axis of rotation of the tire.

According to the method of manufacture described in that document U.S. Pat. No. 3,844,327, a ply is manufactured first of all with continuous reinforcers coated in a rubber matrix, then the continuous reinforcers are cut mechanically. To do that, that document U.S. Pat. No. 3,844,327 foresees a cutting device comprising a support roller and a cutting roller between which the ply passes with its continuous reinforcers, the cutting roller being equipped with a plurality of blades distributed along its length and around its entire circumference. In more detail, the cutting roller comprises several rows of blades in its length, and the blades of two adjacent rows are radially offset about the axis of the cutting roller so as to obtain an offset between the cuts of two adjacent reinforcers.

While it does actually make it possible to obtain a ply with discontinuous reinforcers, the cutting device described in that document U.S. Pat. No. 3,844,327 also displays various disadvantages.

On the one hand, this cutting device offers very little flexibility because the positions of the blades on the cutting roller need to be tailored to the positions of the reinforcers in the ply and to the desired spacing between two cuts of one and the same reinforcer along the length of the ply.

On the other hand, when the reinforcer adopts the form of a collection of braided or twisted threads, the blades of the cutting roller make mechanical cuts which leave the ends of the threads in the ply to splay, namely to separate from one another. Further, such splaying of the threads in the ply is undesirable because it may reduce the cohesion between the ends of the threads and the rubber of the ply and thus initiate cracks in the rubber the spread of which would reduce the endurance of the tire manufactured using this ply.

Still mechanically, but with a view to cutting the reinforcers of a ply with zero degree reinforcers into portions, document EP-0,732,227 proposes a cutting device comprising a reference support likenable to a table and on which the ply is moved longitudinally, and at least one knife moving transversely over the ply and descending towards the ply in the manner of a guillotine to cut several adjacent reinforcers simultaneously. Advantageously, the cutting device also comprises a transverse bar for holding the ply during the cutting action of the knife on the reinforcers.

Because of the length of the knife and the transverse mobility thereof, the cutting device presented in this document EP-0,732,227 offers greater flexibility than the one described in document U.S. Pat. No. 3,844,327. Specifically, the knife of this cutting device allows several juxtaposed reinforcers to be cut, whatever the separation between the reinforcers across the width of the ply.

However, this knife also has the disadvantage of not allowing selective cutting of the reinforcers. Thus, the knife does not allow the cuts of two adjacent reinforcers to be offset. In addition, in the case of a ply comprising other longitudinal elements parallel to the reinforcers, these longitudinal elements will be cut with the reinforcers, something which may prove troublesome when these longitudinal elements are used to impart a certain mechanical integrity to the ply notably so that it can be assembled with other semifinished products.

Finally, because the cutting knife provided in that document EP-0,732,227 also performs mechanical cutting, that cutting device displays the same risks of splaying of the threads in a ply and therefore the same risks of reducing the performance of the tire.

In the same way in document EP-0,732,227 and in document U.S. Pat. No. 3,844,327, the transverse bar coupled to the reference support and the support roller do not allow the reinforcers to be held perfectly while they are being cut. Thus, during each cut, the reinforcer sinks into the thickness of rubber of the ply, and this may lead to a poor-quality cut, with certain threads of a reinforcer crushed, stretched but not cut, and may accentuate the phenomenon of splaying of the ends of the threads of a reinforcer.

Finally, another disadvantage with the cutting devices described in document EP-0,732,227 and in document U.S. Pat. No. 3,844,327 is that the blades and the knife are cutting tools liable to wear quickly and require regular maintenance operations because of the hardness and mechanical strength of certain materials from which the reinforcers are made.

BRIEF DESCRIPTION OF EMBODIMENTS OF THE INVENTION

It is an object of the invention to alleviate at least one of the disadvantages of the reinforcer cutting methods and devices that have just been described.

To this end, the invention proposes a method of manufacturing a strip of rubber comprising discontinuous reinforcers. On the one hand, this method of manufacture comprises at least one step consisting in cutting the reinforcers of a strip of rubber comprising reinforcers capable of being cut and progressing in a direction of conveying, and, on the other hand, this method is characterized in that each cutting of a reinforcer is performed by heating the reinforcer locally and remotely using a laser beam. In order to implement this method, the invention also proposes a device for cutting the reinforcers of a strip of rubber. This cutting device comprises a reinforcer cutting head and a conveying device allowing the strip to be made to progress in a direction of conveying and past the cutting head, and this cutting device is characterized in that the cutting head comprises an emission source emitting at least one laser beam allowing each reinforcer of the strip to be heated locally and remotely in order to cut it.

By virtue of the use of a laser beam, a good quality cutting of the reinforcers is obtained which is no longer dependent on the state of wear of a mechanical cutting tool.

In addition, the use of a laser beam makes it possible to limit the amount of cutting waste liable to contaminate the strip and therefore the future tire. Specifically, the laser beam allows cutting to be performed by sublimation of matter, the material of the reinforcer and the rubber of the strip which are situated in the zone on which the laser beam is focused being converted directly to gas.

Finally, laser beam cutting makes it possible to avoid the phenomenon of the splaying of the threads of a reinforcer within the rubber of the strip. Specifically, and in so far as the threads of a reinforcer are made from a fusible material, the ends of the threads melt and become fused together as they cool.

In order to allow the cutting of the various reinforcers of a strip, the method of manufacture foresees moving the laser beam in at least one transverse direction perpendicular to the longitudinal axis of the strip and parallel to a transverse plane of the strip. To this end, the cutting head of the cutting device comprises optical orientation means for orienting the laser beam allowing the laser beam to be moved in at least one transverse direction perpendicular to the longitudinal axis of the strip and parallel to a transverse plane of the strip.

For preference, the method of manufacture also foresees moving the laser beam in a direction parallel to the longitudinal axis of the strip. To this end, the optical means of orienting the laser beam also allow the laser beam to be moved in this longitudinal direction. This movement of the laser beam in a longitudinal direction is useful for compensating for the potential translational movement of the strip during cutting and for optimizing the paths followed by the laser beam between two cuttings of reinforcers.

Advantageously, thanks to these mobilities of the laser beam and to the possibility of quickly interrupting and resuming the emission of the laser beam, the method and the device according to the invention offer a great deal of flexibility. Specifically, all that is required is for the movements and emission of the laser beam to be commanded appropriately and the distance between two cuts of one and the same reinforcer along the length of the strip, or the offset along the length of the strip between two cuts of two adjacent reinforcers, or the offset along the length of the strip between two cuts of two reinforcers that are neighbours but separated by other reinforcers, can be modified.

Next, the method of manufacture may foresee immobilizing the strip of rubber during each cutting of a reinforcer. However, for preference, and with a view to increasing the rate at which the reinforcers are cut, the method of manufacture foresees performing each cutting of a reinforcer "on the fly" while the strip of rubber undergoes a continuous translational movement caused by a continuous passage of the strip in the conveying direction past the cutting head of the cutting device. Also, the conveying device of the cutting device allows the strip to be made to progress continuously or stepwise past the cutting head.

With a view to obtaining quality cuts, the method of manufacture preferably foresees focusing the laser beam in the transverse plane of the strip in which plane the reinforcers extend. To this end, the cutting device comprises means of adjusting the focusing distance of the laser beam.

Still for preference, the method of manufacture foresees for the laser beam to be focused at a distance of between 200 and 500 millimeters, and for the cutting head of the cutting device to comprise optical means of focusing the laser beam over such a distance. Such a focusing distance offers a good compromise between the energy density of the beam at its focal point, the energy of the beam being determinant with regard to the sublimation of the reinforcer and therefore to the quality of the cutting, because the longer the focusing distance, the more the energy density of the laser beam drops, the size of the beam at its focal point, which has a direct connection with the cutting precision, the space that needs to be left clear above the strip for mounting various air-blowing and extraction equipment, and the working area of the laser beam, in the knowledge that the longer the focal distance, the more extensive this working area can be.

For preference also, and again with a view to obtaining quality cuts, the method of manufacture also foresees for the portion of strip in which the laser cutting of a reinforcer takes place to be free of any support, the cutting device to this end comprising means of suspending the portion of strip in which the laser cutting of a reinforcer is performed. Thanks to this suspension, the laser beam cutting is not impeded by the presence of any support, and the precision of the cut is not disrupted by friction between the strip and any support.

With a view to extracting them, the method foresees sucking up the gases resulting from the laser cutting of a reinforcer. To this end, the cutting device is therefore equipped with means of sucking up these gases.

Finally, the invention also proposes an installation for the manufacture of a strip of rubber comprising discontinuous reinforcers. This installation comprises a device for manufacturing a strip of rubber containing continuous reinforcers and a cutting device for cutting the reinforcers of this strip.

BRIEF DESCRIPTION OF THE DRAWINGS

Other features and advantages of the invention will become apparent from the description which will follow. This description, given by way of nonlimiting example, refers to the attached drawings in which.

DETAILED DESCRIPTION OF EMBODIMENTS OF THE INVENTION

Figure 1:
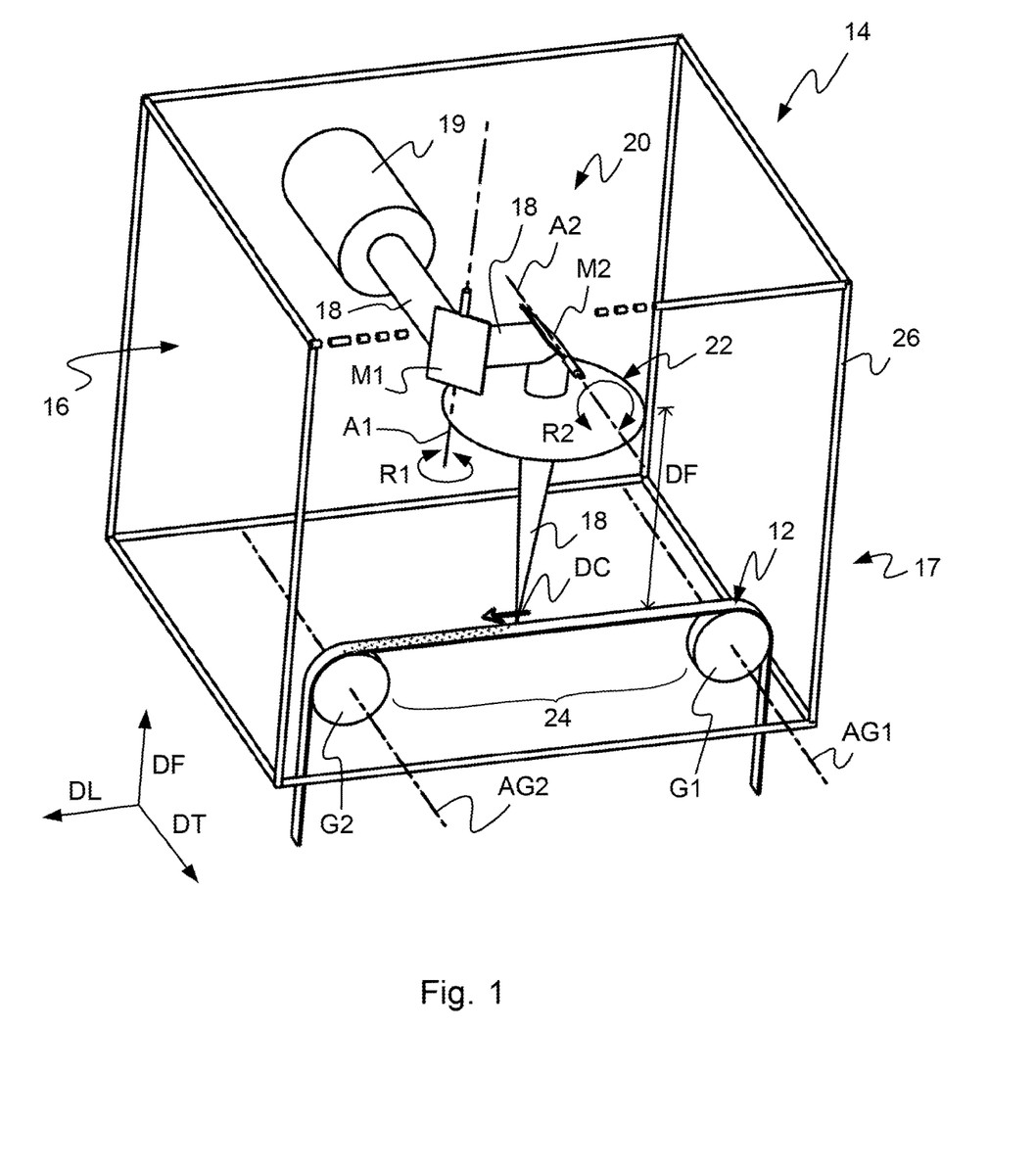
FIG. 1 is a schematic perspective depiction of a device for cutting reinforcers of a strip according to the invention.
Figure 2:
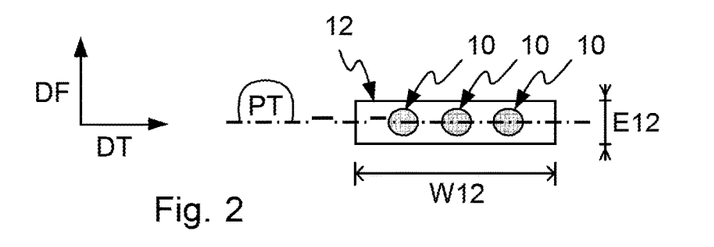
FIG. 2 is a schematic depiction in cross section of a strip comprising reinforcers that can be cut using the method according to the invention.

As FIGS. 1 and 2 illustrate, the invention relates to the cutting of the reinforcers 10 of a strip of rubber 12.

What is meant by a strip is a narrow band of which the width W12 is greater than the height or thickness E12.

What is meant by rubber is preferably an elastomer compound: natural rubber and synthetic rubber, reinforcing fillers: carbon black and silica, plasticizers: oils, resins, and other chemical elements such as sulphur for example.

A reinforcer 10 takes the form of a thread or of a cord comprising a collection of twisted or braided threads. The thread or threads that make up the reinforcer 10 may be of metallic, polymeric, natural nature or of composite nature. For example, a reinforcer 10 may be manufactured from glass, carbon or aramid fibre.

Figure 3:
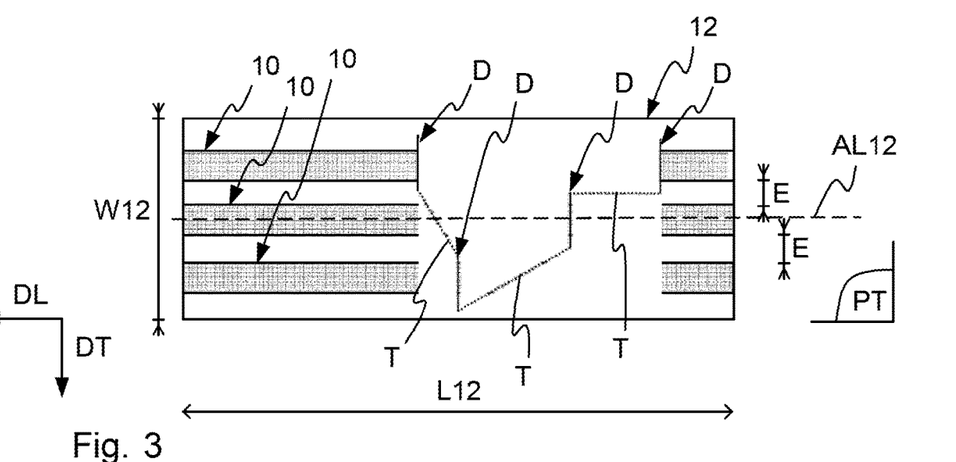
FIG. 3 is a schematic depiction from above of a portion of a strip in which several reinforcers are cut with the method according to the invention.

As FIGS. 2 and 3 illustrate, the reinforcers 10 of a strip 12 extend in the length L12 of the strip. More specifically, with a transverse plane PT dividing the strip 12 into two parts in its thickness E12, these reinforcers 10 extend parallel to the longitudinal axis AL12 of the strip and in one and the same transverse plane PT. In addition, these reinforcers 10 are spaced apart by a uniform space E in the width W12 of the strip.

In order to manufacture a strip 12 with discontinuous reinforcers 10, the method according to the invention foresees at least one step that consists in cutting the reinforcers 10 of a strip 12 of rubber comprising reinforcers 10 capable of being cut, and which are preferably continuous initially, and passing in a direction of conveying DC illustrated by an arrow in FIG. 1. In more detail, each cutting D of a reinforcer 10 is performed by heating the reinforcer 10 locally and remotely using a laser beam.

In order to implement this method, the invention proposes a cutting device 14 as illustrated in FIG. 1 and comprising a cutting head 16 for cutting the reinforcers 10, and a conveying device 17 allowing the strip 12 to be made to progress in the direction of conveying DC and past the cutting head 16. In more detail, this cutting head 16 comprises an emission source 19 emitting at least one laser beam 18 allowing each reinforcer 10 of the strip to be heated locally and remotely in order to cut same.

Since a strip 12 comprises several reinforcers 10 which are juxtaposed in one and the same transverse plane PT, the method foresees moving the laser beam 18 in at least one transverse direction DT perpendicular to the longitudinal axis AL12 of the strip 12 and parallel to a transverse plane PT of the strip. Thus, and as FIG. 3 illustrates, the laser beam 18 allows various cuttings D of various reinforcers 10 considered across the width W12 of the strip to be performed.

In order to achieve this transverse movement of the laser beam 18, the cutting head 16 of the cutting device 14 comprises optical means 20 of orienting the laser beam allowing the laser beam 18 to be moved in at least one transverse direction DT perpendicular to the longitudinal axis AL12 of the strip and parallel to a transverse plane PT of the strip.

To complement this, the method also foresees moving the laser beam 18 in a longitudinal direction DL parallel to the longitudinal axis AL12 of the strip. To this end, the optical means 20 of orienting the laser beam also allow the laser beam 18 to be moved in a longitudinal direction DL parallel to the longitudinal axis AL12 of the strip. Thus, the laser beam 18 may follow a path T that is purely longitudinal or that combines a transverse movement with a longitudinal movement between two different cuts D, as FIG. 3 shows. Of course, when following a path T between two cuts D, the emission of the laser beam 18 is interrupted.

According to another advantage, moving the laser beam 18 longitudinally makes it possible to compensate for a translational movement of the strip 12 in the direction of conveying DC as a cut D is being performed.

Specifically, the method may foresee for the strip 12 of rubber to undergo a continuous translational movement in the direction of conveying DC during each cutting D of a reinforcer 10, with a view to increasing the rate at which these cuts D are made. Alternatively, and for example in order to favour the quality of the cutting D, the method may foresee immobilizing the rubber strip 12 during each cutting D of a reinforcer 10. So, the conveying device 17 allows the strip 12 to be made to progress continuously or step by step past the cutting head 16.

From a general viewpoint, combining the longitudinal and transverse movements of the laser beam 18 makes it possible to optimize the paths T followed by the laser beam 18 between the different cuttings D of reinforcers 10 so as to increase the rate at which these cuts D can be made, and therefore the rate at which a strip with discontinuous reinforcers can be manufactured.

In order to allow such longitudinal and transverse movements of the laser beam 18, the optical means 20 of orienting the laser beam preferably adopt the form of two mobile mirrors M1, M2 the mirrors M1, M2 being oriented in such a way that the first mirror M1 receives the laser beam 18 from the emission source 19 and reflects this laser beam 18 towards the second mirror M2. In addition, the second mirror M2 is oriented in such a way as to reflect the laser beam towards the strip 12.

For preference, the first mirror M1 is mounted with rotational mobility R1 about a first axis A1 perpendicular to a second axis A2 about which the second mirror M2 is mounted in rotation R2. In greater detail, the axis of rotation A1 of the first mirror M1 is perpendicular to the longitudinal direction DL and to the transverse direction DT, whereas the axis of rotation R2 of the second mirror M2 is parallel to the transverse direction DT. Thus, the rotation R1 of the first mirror M1 makes it possible to control the transverse movements of the laser beam 18, whereas the rotation R2 of the second mirror M2 makes it possible to control the longitudinal movements of the laser beam 18.

In order to obtain rapid and precise control of the rotations R1, R2 of these two mirrors M1, M2, each of its mirrors is rotationally driven by a motor of galvanometric type.

Longitudinal and transverse movements of the laser beam 18 more specifically mean longitudinal and transverse movements of the focal point PF of the laser beam 18.

Specifically, in order to make a cut D, the laser beam 18 is focused. This focusing allows the energy of the beam to be concentrated and thus allows the reinforcer 10 to be raised to a heating temperature hot enough that it can be cut by sublimation.

In order to obtain a good compromise between the energy density of the beam at its focal point PF, the size of the focal beam 18 at its focal point PF, the space available above the strip 12 for mounting various items of equipment, and the working area of the laser beam 18, the method foresees focusing the laser beam 18 over a focusing distance F of between 200 and 500 millimeters. To that end, the cutting head 16 of the cutting device 14 comprises optical means 22 of focusing the laser beam 18 over a focusing distance F of between 200 and 500 millimeters. For preference, these optical means 22 of focusing the laser beam 18 take the form of an optical lens. Within the cutting head 16, this optical lens is arranged in such a way that the laser beam 18 passes through it after it has been reflected by the mirrors M1, M2 of the optical orientation means 20. Of course, the focusing distance F of between 200 and 500 millimeters offers a good compromise with the types of laser beam 18 used to implement the invention, these types of laser beam 18 being defined later on in the present description.

The optical means 20 of orienting the laser beam allow the movements of the focal point PF of the laser beam 18 to be controlled very precisely in the longitudinal DL and transverse DT directions, the cutting device 14 also comprises means, not illustrated in the figures, of adjusting the focal distance F of the laser beam 18. These adjusting means allow precise control over the movements of the focal point PF of the laser beam 18 in a direction of focusing DF perpendicular to the longitudinal DL and transverse DT directions and with respect to the transverse plane PT situated in the thickness E12 of the strip and in which the reinforcers 10 extend.

Various adjusting means may allow the position of the focal point PF of the laser beam 18 to be adjusted in the direction of focusing DF.

In a first alternative form, there may be provided a device that acts on the optical lens of the optical focusing means 22, this device for example allowing the position of this lens to be altered mechanically in the direction of focusing DF.

In another alternative form, which may potentially be combined with the first one, a device allows the adjustment of the position, in the direction of focusing DF, of a portion 24 of the strip 12 in which portion the cutting D of a reinforcer 10 is performed. Advantageously, the conveying device 17 allows the position of the portion 24 to be adjusted in the direction of focusing DF.

Overall, precise control of the movements of the focal point PF of the laser beam 18 in the three, transverse DT, longitudinal DL and focusing DF, directions makes it possible to ensure the quality of the cutting D of each reinforcer 10, notably by allowing the matter of the reinforcer 10 to be sublimated and fusing together the threads of a reinforcer 10 that is in the form of a cord.

Figure 4:
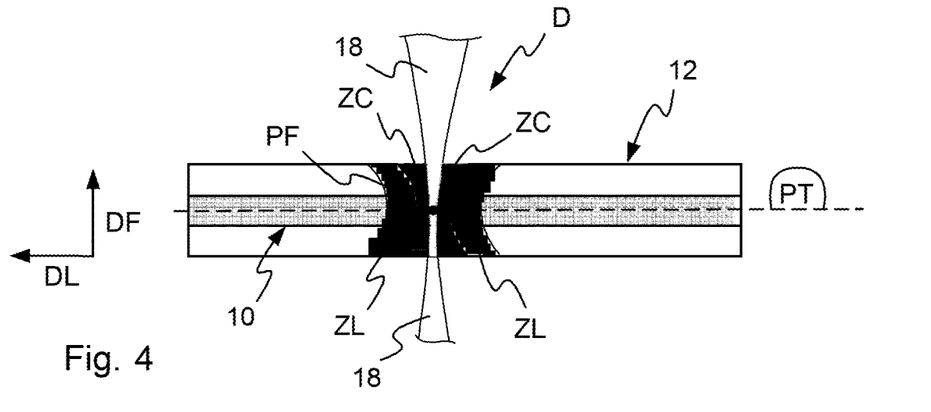
FIG. 4 is a schematic depiction in longitudinal section of a cutting of a reinforcer using the method according to the invention.

As FIG. 4 illustrates, when making a cut D, the method preferably foresees focusing the laser beam 18 in the transverse plane PT in which the reinforcers 10 that are to be cut are situated. By positioning the focal point PF of the laser beam 18 in this way, namely by positioning that portion of the beam in which the beam energy is the most concentrated in the core of the reinforcer 10 that is to be cut, the power of the emission source 19 is used to full effect and it is possible to be sure of achieving an optimal cut D by sublimation of matter.

In more detail, during the cutting D of a reinforcer 10 using a laser beam 18 focused in the transverse plane PT in which the reinforcers 10 that are to be cut are situated, the laser beam 18 causes sublimation of a central zone ZC encompassing a segment of the reinforcer 10 and the rubber of the strip 12 that surrounds this segment. At the same time, the laser beam 18 also heat-affects two lateral zones ZL situated one on each side of the central zone ZC. It is more specifically within these lateral zones ZL that the ends of the threads of a reinforcer 10 in the form of a cord melt and become fused together as they cool.

As illustrated in FIG. 3, because of the focusing of the laser beam 18, the cutting D of a reinforcer 10 requires a transverse movement DT of the laser beam 18. Specifically, the diameter of the laser beam 18 at its focal point PF is approximately 10 microns, whereas the diameter of a reinforcer 10 is in the region of 0.4 to 0.6 millimeters.

The small diameter of the focused laser beam 18 offers a cutting precision to within 0.01 millimeters, making it possible to avoid damaging the reinforcer 10 adjacent to the reinforcer 10 cut, or any other longitudinal element juxtaposed in the strip with the reinforcer cut.

For preference, the type of laser used: pulsed, continuous or other, is chosen according to the cross section of this reinforcer 10 and to the type of material(s) of the thread or threads of which this reinforcer 10 is made, each material having its own sublimation temperature and greater or lesser absorbency of certain wavelengths.

By way of example, in order to achieve sublimation of metallic reinforcers 10 measuring from 0.2 to 0.7 millimeters in diameter, it is preferable to use a continuous ytterbium-doped fibre laser beam 18, with an emission source that has a power of at least 250 W and a wavelength comprised between 1000 nanometers and 1100 nanometers. Further, in order to achieve sublimation of nonmetallic reinforcers 10, for example made of aramid or PET (polyethyleneterephthalate) fibre, it is preferable to use a $CO_2$ laser beam 18 with an emission source that has a power of at least 100 W and a wavelength of between 9350 nanometers and 10 740 nanometers.

Again with a view to obtaining quality cuts D, the method also foresees freeing the portion 24 of the strip 12 in which the laser cutting D of a reinforcer 10 is being performed of any support. To this end, the cutting device 14 comprises means of suspending the portion 24 of strip 12 in which the laser cutting D of a reinforcer 10 is being performed. For preference, these suspensions means are formed by the conveying device 17 which comprises at least two wheels G1, G2 for conveying the strip 12. Because these two wheels G1, G2 are distant from one another in the longitudinal direction DL, the suspended portion 24 of the strip 12 extends between these two wheels. In more detail, these two wheels G1, G2 are respectively mounted free to rotate and as a free wheel, about respective axes AG1, AG2 parallel to the transverse direction DT and arranged on either side of the firing or working zone of the laser beam 18.

For preference, the strip 12 is translationally driven in the direction of conveying DC by a drive system (not depicted in the figures) provided downstream of the wheel G2. Advantageously, the wheels may be fitted with lateral flanges (not depicted in the figures) to guide the strip 12 and/or with opposing wheels (not depicted in the figures) also allowing improved control over the guidance of the strip.

For preference also, a tensioning system (not depicted in the figures) for tensioning the strip 12 is provided upstream of the wheel G1. Thus, the suspended portion 24 of the strip is placed under tension and the various reinforcers 10 situated in this portion 24 of the strip are properly aligned in the transverse plane PT in which the laser beam 18 is focused and, more particularly, in the transverse direction DT, thereby making it possible to guarantee the quality of the cuttings D of these reinforcers.

As the sublimation of matter leads to releases of gas that may be harmful or simply contaminating, the method foresees extracting the gases emanating from the laser cutting D of a reinforcer 10. Advantageously, this extraction also allows any combustion residue of matter situated in the heat-affected lateral zones ZL to be sucked up. In order to perform this extraction, the cutting device 14 comprises suction means, such as a suction pipe connected to an extractor, for sucking up the gases emanating from the laser cutting D of a reinforcer 10.

With a similar view to protecting individuals and its environment, the cutting device 14 is preferably housed in an enclosed space 26.

With a view to protecting the lens of the optical focusing means 22 from any splashing during the sublimation of the material of a reinforcer 10 or of the rubber of the strip 12, the method foresees installing an air curtain beneath this lens. Within the cutting device 14, this air curtain is implemented for example using flat nozzles supplied with compressed air and delivering a flow of air perpendicular to the laser beam 18 and oriented towards the strip 12 so as to repel any splashes caused during the making of a cut D.

The present invention also covers an installation 28 for the manufacture of a strip 12 of rubber comprising discontinuous reinforcers 10. Such a manufacturing installation 28, illustrated in FIG. 5, comprises a device 30 for the manufacture of a strip 12 of rubber comprising continuous reinforcers 10 and a cutting device 14 for cutting the reinforcers 10 of this strip 12. For example, the manufacturing device 30 is a calendering or extrusion device 32 fed from reels 34 of reinforcer 10 and a reel 36 of rubber. Advantageously, the manufacturing installation 28 also comprises a storage reel 38 for the strip 12 with discontinuous reinforcers output from the cutting device 14.

In one application targeted by the present invention, the strip of rubber 12 with discontinuous reinforcers 10 is used to reduce the thickness of rubber in the bottom part of a tire sidewall. To give a sense of scale, a strip of rubber 12 used in such an application has, for example, a width W12 of 10 millimeters and a thickness E12 of 0.8 millimeters and this strip comprises fourteen parallel reinforcers 10 measuring 0.4 millimeters in diameter, there being a 0.3 millimeter space separating two adjacent reinforcers 10 across the width W12 of the strip 12. To give a sense of scale, by virtue of the present invention, such a strip 12 can be manufactured at a rate of 200 millimeters per second.

In other applications envisioned by the invention, the strip of rubber 12 with discontinuous reinforcers 10 is used to produce another part of the sidewall of a tire, the shoulders of a tire or the crown of a tire.

On the one hand, the presence of reinforcers 10 in a strip allows an improvement in the mechanical properties, such as the rigidity for example, of the part of the tire produced using this strip, thereby making it possible to reduce the thickness of rubber in this part of the tire and therefore generally to improve the behaviour and performance of the tire.

And on the other hand, the discontinuity of the reinforcers 10 allows the strip a greater amount of stretch than the stretch of a strip containing the same reinforcers but with the reinforcers continuous. Thus, the strip 12 with discontinuous reinforcers 10 can be used to produce certain parts of a tire, such as the bottom part of a tire sidewall for example, which are intended to undergo deformation in the raw state by stretching during a step in the manufacture of the tire, and notably during the step known as the shaping of the green form of the future tire.

Figure 5:
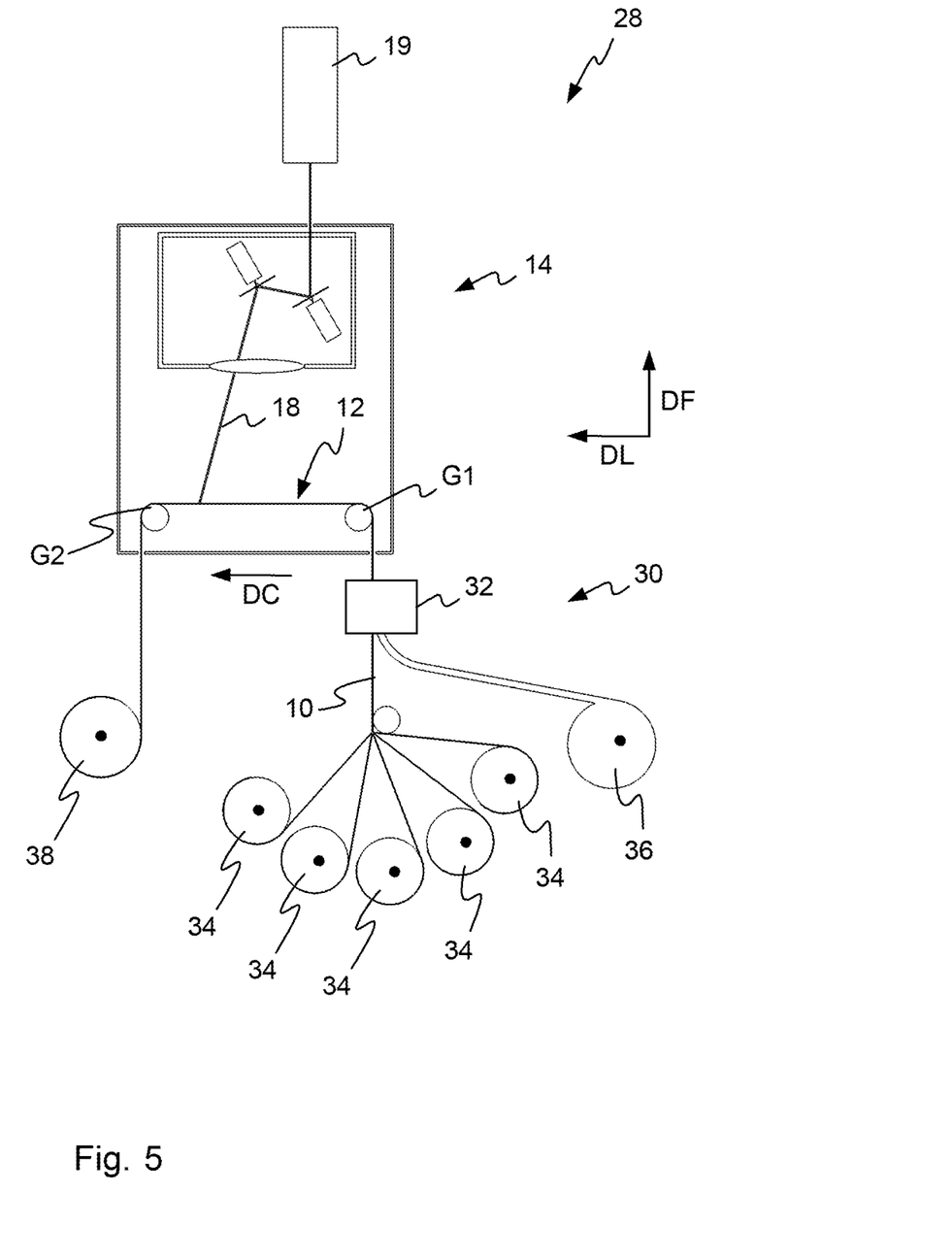
FIG. 5 is a schematic depiction of a first alternative form of an installation for manufacturing a strip of rubber comprising a cutting device according to the invention.

In a first alternative form of the manufacturing installation 28 illustrated in FIG. 5, the cutting device 14 is arranged vertically: the direction of focusing DF in which the laser beam 18 is emitted being substantially vertical, and the strip 12 progressing past the cutting head 16 in such a way that the transverse plane PT of the strip in which plane the reinforcers 10 are situated is substantially horizontal past this cutting head 16. More specifically, the portion 24 of the strip progresses substantially horizontally under the cutting head. In this first alternative form, the direction of conveying DC of the strip 12 past the cutting head 16 is substantially horizontal.

Figure 6:
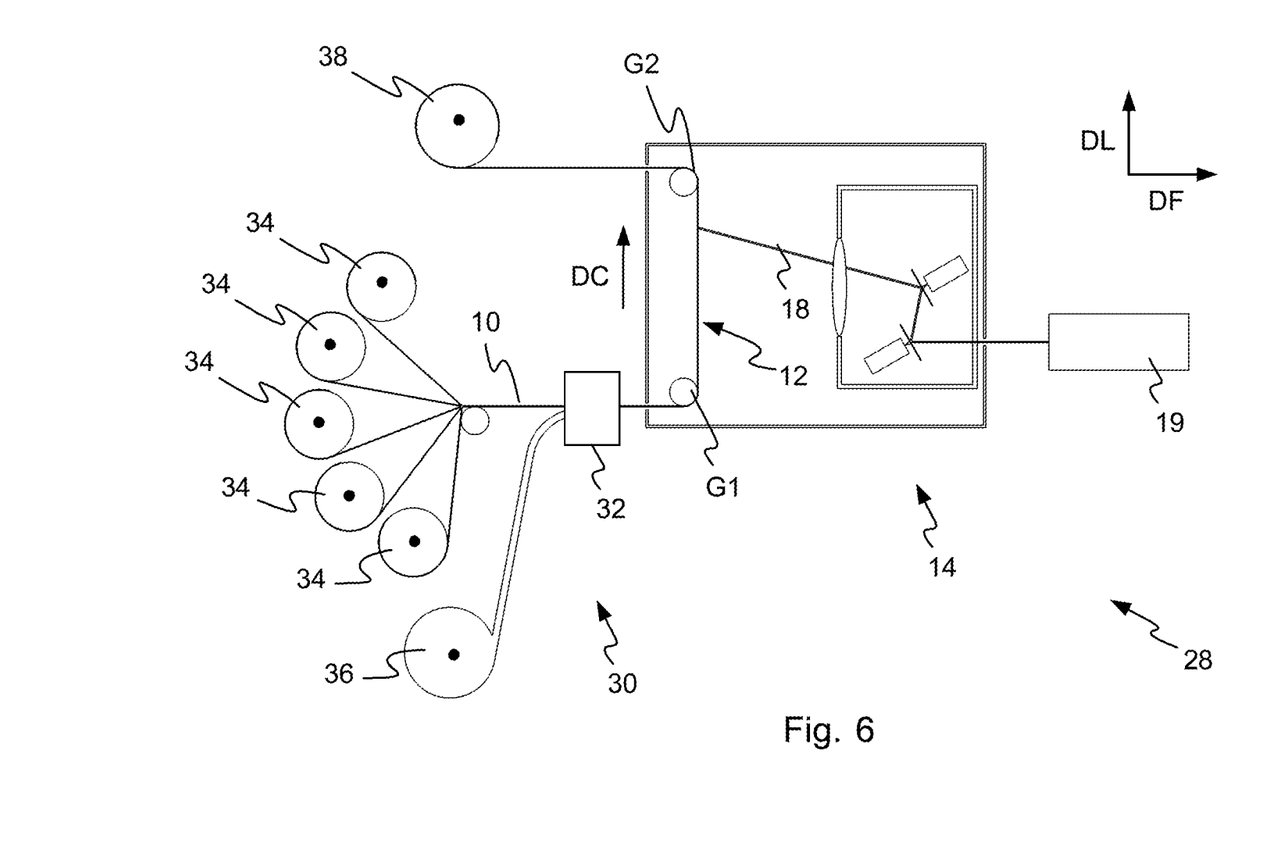
FIG. 6 is a schematic depiction of a second preferred alternative form of an installation for manufacturing a strip of rubber comprising a cutting device according to the invention.

In a preferred second alternative form of an installation illustrated in FIG. 6, the cutting device 14 is arranged horizontally: the direction of focusing DF in which the laser beam 18 is emitted being substantially horizontal, and the strip 12 progressing past the cutting head 16 in such a way that the transverse plane PT of the strip in which plane the reinforcers 10 are situated is substantially vertical past this cutting head 16. More specifically, the portion 24 of the strip progresses substantially vertically past the cutting head. In this second alternative form, the direction of conveying DC of the strip 12 past the cutting head 16 is preferably substantially vertical and oriented upwards. This second alternative form advantageously makes it possible to prevent fumes derived from the cutting D of the reinforcers 10 from disrupting the correct operation of the optical means 20 for orienting and 22 for focusing the laser beam 18.

The invention claimed is:

1. A method of manufacturing a rubber strip having discontinuous reinforcer segments, the method comprising steps of:
    conveying, in a conveying direction, a strip of rubber containing reinforcers; and
    cutting each of the reinforcers of the strip of rubber by using a laser beam from a remote laser source to cause localized heating of each of the reinforcers, to produce discontinuous reinforcer segments from each of the reinforcers, wherein each of the reinforcers has a diameter of 0.4 mm to 0.6 mm, wherein, in the cutting step, the laser beam is focused at a focal distance in a range between 200 mm and 500 mm, wherein in the cutting step, the laser beam is moved by a first mirror in a transverse direction perpendicular to a longitudinal axis of the strip of rubber, wherein in the cutting step, the laser beam is moved by a second mirror in a longitudinal direction parallel to the longitudinal axis of the strip of rubber, and wherein after the laser beam is reflected by the first mirror and the second mirror, the laser beam passes through a lens before reaching the strip of rubber.

2. The method according to claim 1, wherein a transverse plane divides the strip of rubber into two parts in a thickness of the strip of rubber, and wherein the transverse direction is parallel to the transverse plane.

3. The method according to claim 1, wherein the conveying step includes a portion in which the strip of rubber is immobilized, and wherein the cutting step includes cutting at least one of the reinforcers during the portion of the conveying step in which the strip of rubber is immobilized.

4. The method according to claim 1, wherein, in the cutting step, each of the reinforcers of the strip of rubber is cut while the strip of rubber undergoes a continuous translational movement in the conveying direction.

5. The method according to claim 1, wherein, in the cutting step, the laser beam is focused at a transverse plane of the strip of rubber, the reinforcers being positioned in the transverse plane.

6. The method according to claim 1, wherein, in the conveying step, the strip of rubber is suspended such that, in the cutting step, a portion of the strip of rubber at which the laser beam causes localized heating to cut a reinforcer of the strip of rubber is free of any other support.

7. The method according to claim 1, wherein the conveying comprises using a conveying device that includes two wheels disposed apart from one another in the longitudinal direction, the two wheels being arranged on opposite sides of a working zone of the laser beam.

8. The method according to claim 1, further comprising a step of placing the strip of rubber under tension.

9. The method according to claim 1, further comprising a step of extracting gases emanating from laser cutting of the strip of rubber, using a suction pipe connected to an extractor.

10. The method according to claim 1, further comprising a step of providing an air curtain between the lens and the strip of rubber to repel splashes caused during laser cutting of the strip of rubber.

11. A cutting device for cutting reinforcers in a rubber strip, the cutting device comprising:

a reinforcer cutting head comprising a remote laser, a first mirror, a second mirror, and a lens; and a conveyor that conveys a strip of rubber containing reinforcers in a conveying direction past the cutting head, wherein the remote laser produces at least one laser beam to cause localized heating of at least one of the reinforcers of the strip of rubber, to produce discontinuous reinforcer segments from each of the at least one of the reinforcers, wherein each of the reinforcers has a diameter of 0.4 mm to 0.6 mm, wherein the at least one laser beam is focused at a focal distance in a range between 200 mm and 500 mm, wherein the first mirror is configured to move the at least one laser beam in a transverse direction perpendicular to a longitudinal axis of the strip of rubber, wherein the second mirror is configured to move the laser beam in a longitudinal direction parallel to the longitudinal axis of the strip of rubber, and wherein after the laser beam is reflected by the first mirror and the second mirror, the laser beam passes through the lens before reaching the strip of rubber.

12. The cutting device according to claim 11, wherein a transverse plane divides the strip of rubber into two parts in a thickness of the strip of rubber, and wherein the transverse direction is perpendicular to the longitudinal axis of the strip of rubber and is parallel to the transverse plane.

13. The cutting device according to claim 11, wherein the conveyor conveys the strip of rubber past the cutting head continuously or stepwise in a stop and start manner.

14. The cutting device according to claim 11, further comprising an adjuster structured to adjust the focal distance of the laser beam.

15. The cutting device according to claim 11, wherein the cutting head further comprises an optical focus adjuster for focusing the focal distance.

16. The cutting device according to claim 11, wherein the conveyor is structured to suspend a portion of the strip of rubber at which the at least one laser beam causes localized heating to cut the at least one of the reinforcers of the strip of rubber.

17. A manufacturing installation for producing a rubber strip having discontinuous reinforcer segments, the installation comprising:

an apparatus for producing a strip of rubber containing continuous reinforcers; and the cutting device according to claim 11.

* * * * *